May 8, 1934.  F. J. HINTON  1,957,646
ART OF PRODUCING COLORED PICTURES
Filed Dec. 10, 1931   2 Sheets-Sheet 1

INVENTOR.
Francis J. Hinton
BY
Morsell & Morsell
ATTORNEYS.

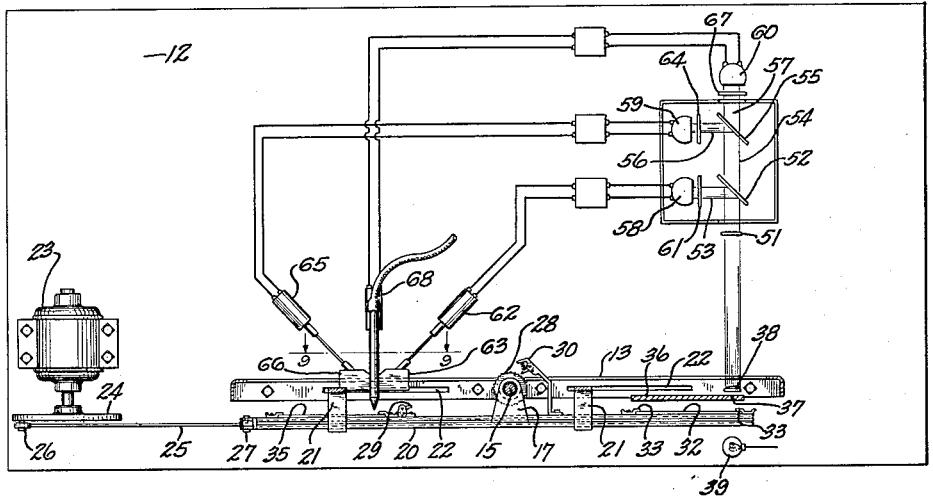
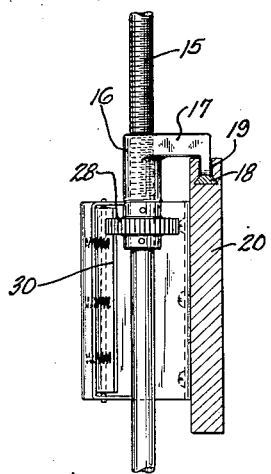
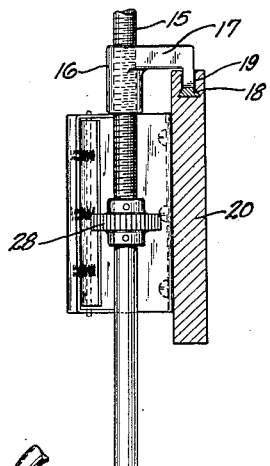
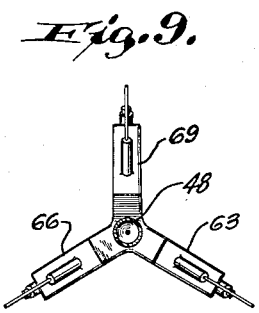

Patented May 8, 1934

1,957,646

UNITED STATES PATENT OFFICE

1,957,646
ART OF PRODUCING COLORED PICTURES
Francis J. Hinton, Milwaukee, Wis.

Application December 10, 1931, Serial No. 580,093

5 Claims. (Cl. 178—5)

This invention relates to improvements in the art of producing colored pictures.

In recent years, the photographing of colored objects by the use of color plates in a camera has been carried out with considerable success, and the exposed and developed plate has been used in connection with transmitted light to reproduce the object photographed on a screen, the object appearing in its natural colors. Up to the present time, however, no successful method has been devised for making prints or permanent reproductions in color from a color plate. Various experiments have been made in attempts to solve the problem chemically by utilizing paper which has been treated so as to be sensitive to the several prime colors of the spectrum, but such attempts have been unsuccessful.

It is one of the objects of the present invention to provide improvements in the art of producing colored pictures which provides for the accurate making of prints from a color plate or the like.

A further object of the invention is to provide improved apparatus for carrying out the novel method.

With the above and other objects in view, the invention consists of the improved art of producing colored pictures and all its parts and combinations as set forth in the claims, and all equivalents thereof.

In the accompanying drawings, in which the same reference numerals designate the same parts in all of the views:

Figs. 5 and 6 are enlarged vertical sectional views showing the mechanism for causing vertical progression of the reciprocating frame;

Fig. 7 is an enlarged detail view of the air brush, parts being broken away and shown in section;

Fig. 8 is a plan view similar to Fig. 1 showing a modified form of apparatus;

Fig. 9 is an enlarged sectional view taken on line 9—9 of Fig. 8; and

Fig. 10 is a fragmentary plan view showing a modification wherein the light is reflected from a source by the original being scanned.

Figure 1:
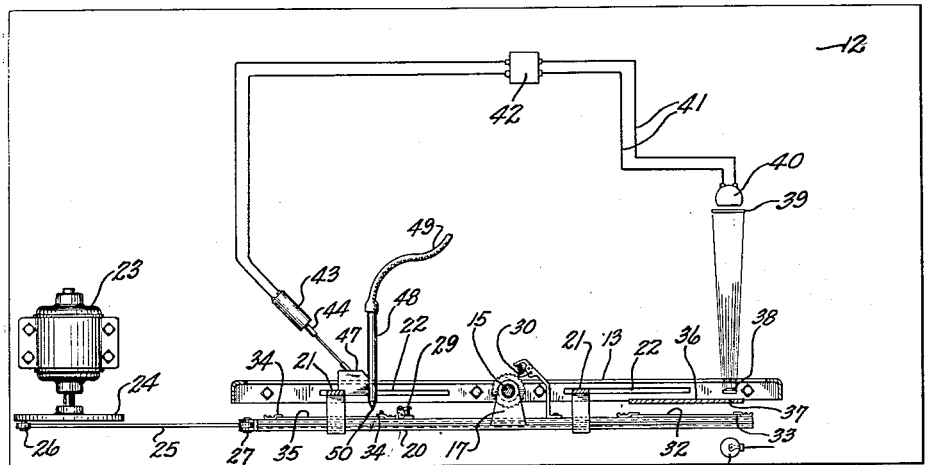
Fig. 1 is a plan view of the preferred apparatus for carrying out the improved method, part being shown in section taken along the line 1—1 of Fig. 2, and part of the apparatus being shown diagrammatically.
Figure 2:
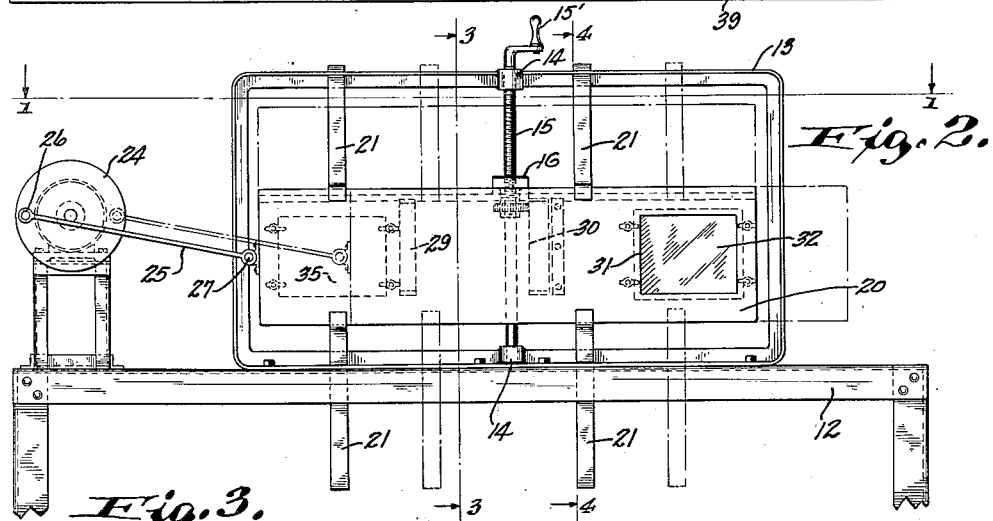
Fig. 2 is a front elevational view of the improved apparatus.
Figure 3:
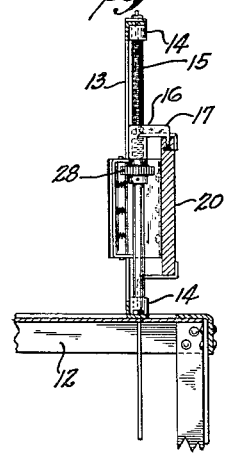
Fig. 3 is a sectional view taken on line 3—3 of Fig. 2.
Figure 4:
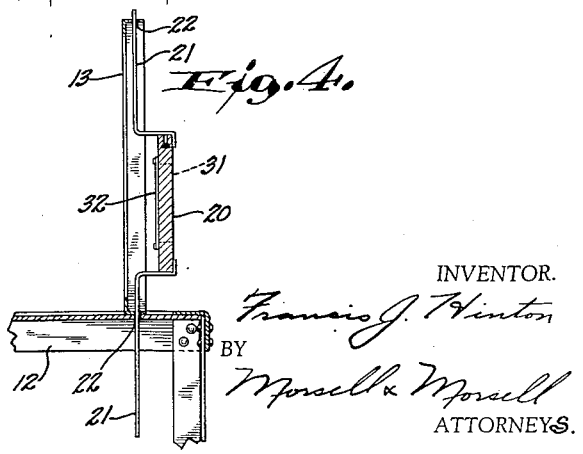
Fig. 4 is a sectional view taken on line 4—4 of Fig. 2.

Referring to the drawings, there is mounted on a suitable table 12 a frame 13. The said frame has opposite side portions provided with bearings 14 within which unthreaded ends of a screw 15 are journaled. The said screw is threaded into the bore of a lifting member 16, and said member is provided with an L-shaped extension 17 having its extreme end of dove-tail formation as at 18 (see Figs. 5 and 6). Said dove-tail end of the lifting member is fitted within a dove-tail slot 19 of a reciprocating frame 20, the connection providing for horizontal sliding movement of the frame 20 with respect to the lifting member 16.

The frame may be provided with suitable guiding members 21 extending from both longitudinal edges thereof, and said members are adapted to move in elongated slots 22 of the outer frame 13, the said guiding members and slots thus permitting reciprocal movement of the frame 20 in a horizontal plane, and also permitting vertical progressive movement.

A suitably mounted electric motor 23 has rigidly secured to its drive shaft a wheel 24 to which one end of an arm 25 is eccentrically connected as at 26. The other end of the arm 25 is pivotally connected as at 27 to the frame 20. It will be apparent that upon operation of the electric motor, that the frame 20 will be reciprocally moved in a horizontal direction.

A ratchet wheel 28 is rigidly mounted on the screw 15. The frame 20 has mounted thereon pivoted dogs 29 and 30. When the frame is moved by the electric motor from the position shown in Fig. 1 toward the right, at the end of said movement the dog 29 will engage the ratchet wheel 28 and will cause a slight rotation of said ratchet wheel and a corresponding rotation of the screw 15. Due to the threaded connection of the screw with the lifting member 16, this will cause a slight raising of the reciprocating frame. When the frame 20 is moved in the other direction, the dog 29 will slip past the ratchet wheel, and near the end of the movement the dog 30 will impart a slight rotation to the ratchet wheel and screw 15 to cause an additional vertical lifting of the reciprocating frame. Thus, at the end of each stroke of the arm 25, the frame 20 will be raised a fraction of an inch.

The frame 20 near one end is formed with an opening 31 therein, over which may be mounted a color plate 32. Any form of holding means, such as the clips 33, may be utilized for anchoring the color plate in position. In a corresponding position on the other hand of the frame 20, other clips 34 are provided for removably holding a piece of paper or the like 35 in position on which the picture is to be produced.

A crank 15' on the upper end of the screw 15 is provided to permit manual rotation of the screw to return the frame to lowered position after a scanning operation.

An opaque shield 36 having a scanning hole 37 of minute size formed in one corner thereof, may be supported in any desired manner over the color plate 32, the shield, however, being supported in a fixed position, and not being movable with the frame 20. It is also desired to mount in any suitable manner in a fixed position over the scanning hole 37 a light diffusing lens 38. A suitable source of white light 39 is mounted in a fixed position in alinement with the scanning hole 37 of the shield 36, and on the other side of the color plate. Light from this source is arranged to pass through the color plate through the scanning hole 37, through the lens 38 and through a light filter 39 to a photoelectric cell 40. The photoelectric cell is of standard construction, and is adapted to be excited by light rays transmitted thereto to cause a flow of electric current through conductors 41, which is directly proportional to the strength of the light ray acting on the photoelectric cell. The current in the conductors 41 may then be passed through an amplifier 42, and from there it is led through the wires 41 to a solenoid 43.

The solenoid 43 is provided with a movable member such as a magnetic plunger 44 which is movable in response to flow of current through the solenoid to cause opening of a normally closed valve 45, and to permit flow of pigment or ink 46 from a container 47 into an air brush 48. (See Fig. 7.) The air brush may be connected by means of tubing 49 or the like with a source of compressed air.

The said air in passing through the brush causes suction of ink or pigment from the reservoir 47 when the valve 45 is opened. This ink or pigment is then discharged from the nozzle 50 of the air brush onto the picture receiving surface 35.

The type of color plate 32 which it is preferred to utilize is commercially well known. It consists of a transparent plate of glass or the like having a color screen on one side thereof and having a photographic emulsion behind the color screen. The color screen which acts as a filter is composed of a definitely proportioned mixture of very minute starch grains of the three following colors: violet-blue, orange-red and green. In the process of photographing a colored object, the plate is so placed in the camera that the glass side faces the object, the emulsion being toward the rear of the camera, and the color screen being in between. The latter filters out the complementary color of each separate grain of the color screen, and therefore does not allow the color which is complementary to any one specific color grain to pass through and act upon the emulsion at that point, and at such point the emulsion is unexposed and upon development is transparent.

If a yellow object is being photographed, yellow which is the complementary color of the violet-blue grains of the color screen will not act upon the photographic emulsion at any of the points where violet-blue starch grains appear. However, since yellow light is the sum of orange-red and green light, the yellow will pass through both the orange-red and green grains, and will act upon the emulsion of the plate wherever these grains are located. Thus, when a plate has been exposed to yellow light, the emulsion has been acted upon only at points behind the orange-red and green grains, and upon development the emulsion is blackened at these points, whereas it is transparent at points behind the violet-blue grains. If the plate is developed and viewed through transmitted light, the yellow object will appear in outline as a negative, with the color of the object appearing upon the plate in the color complementary to the color of the object photographed, and therefore in the example just given, violet-blue. The same line of reasoning follows when other colored objects such as blue or red are being photographed. Inasmuch as the other colors appearing in nature are variations and mixtures of the three subtractive prime colors, yellow, red and blue, they will act upon a color plate in direct proportion to the color of the object being photographed.

Color plate transparencies as above described are in the form of negatives, but they are usually made into positives after exposure and development by a chemical reversal process which is well known, so that the positive plate can be viewed by transmitted light or used for projection on a screen by means of a suitable projection lantern.

In color printing, any color can be produced by the proper proportioning of transparent yellow, red and blue colors superimposed upon one another on a white surface.

With this theory in mind, a color plate in the form of a negative which has been exposed and developed as before described, is placed on the reciprocating frame as shown at 32. As before mentioned, the color plate in negative form will contain a negative reproduction of the object photographed, and the colors of the object on the plate will be complementary to the natural colors of the object itself, that is, where the object was yellow, the negative will be violet-blue. Where the object was red, the negative will be green, and where the object was blue, the negative will be orange-red. Since it is the object of this process to print the colors using the three prime colors, red, yellow and blue, it will be necessary for the apparatus to analyze the color values and intensities of the color plate negative. Assuming that a yellow object has been photographed, the negative will be transparent behind all of the violet-blue grains of the color screen, and will be opaque behind the grains of the two other colors. Therefore, if light is transmitted through the negative from a source, it will only pass through the violet-blue grains.

When the electric motor 23 is set in operation, it will cause the frame 20 to move back and forth horizontally, each stroke being so arranged that it is slightly greater than the width of the color plate. As before explained, at the end of each horizontal stroke of the frame, it will be moved a fraction of an inch upwardly. It is preferred that this distance be approximately 1/125 of an inch. Thus the negative will be moved with respect to the scanning hole 27 of the opaque shield 36 so that in effect the hole 37 scans the entire surface of the negative line by line, and the lines of scanning being separated approximately 1/125 of an inch. This scanning operation is continued until the entire negative has been covered.

Assuming that we are using the plate above referred to containing in part the record of a yellow object, during the scanning operation, the light from the source 39 will be permitted to pass through the negative, through the scanning hole 37, and through the lens 38 and will reach the photoelectric cell through a violet-blue filter 39 only when violet-blue grains appear on the negative. The light through any other grains appearing on this negative will not pass the violet-blue filter and therefore will not act upon the photocell. This violet-blue light, being permitted to pass through the violet-blue filter 39, will act upon the photoelectric cell 40 in a manner directly proportional to the transparency of the negative, thus causing a correspondingly strong or weak electrical current to flow through the conductors 41 and amplifier 42 to the solenoid 43. Thus, wherever violet-blue grains appear on the negative, the solenoid will be energized, causing opening of the valve 45 to an extent directly proportional to the intensity of the light received by the cell, and will permit pigment to be drawn from the container 47 into the air brush 48 and deposited on the paper. Inasmuch as it is desired to print yellow, yellow pigment will, of course, be used in the container. Thus, a reproduction in yellow color will be produced on the paper 35, which will correspond exactly to the yellow in the object photographed originally.

Where the object photographed originally is of several colors, each color must be scanned separately. If it is first desired to scan the yellow color of the negative which appears in the form of violet-blue grains, yellow pigment is used in the container 47, and a violet-blue filter is placed in front of the photoelectric cell 40, as at 39. This filter will prevent the passage therethrough of any other light rays except the violet-blue, and thus yellow will be deposited on the paper 35 wherever violet-blue grains appear on the plate. Next, the plate is scanned for red which appears on the negative in the form of green starch grains, a green filter being used in front of the photoelectric cell as at 39, and red pigment being used in the container 47. When this scanning has been completed, all of the portions of the object which were red and which were reproduced on the negative by means of the green starch grains, will be deposited by means of red pigment on the paper 35. The plate is then analyzed for the third color, blue, which appears on the negative in the form of orange-red starch grains, an orange-red filter being used at 39, and blue pigment being used in the container 47.

Any combinations of the prime colors in the original will be reproduced by combinations of the various pigments, and black portions of the object being reproduced on the negative by the exposure of all three colors of starch grains, will cause a deposit of all three of the different colors of pigment on the paper in superimposed position to produce black.

If it is desired to print a picture by one scanning operation, the apparatus disclosed in Fig. 8 may be utilized. In this form the light from the scanning hole 37 passes through the lens 38 and through a second lens 51. There is then interposed in the path of the light a transparent mirror 52 which reflects some of the light in a direction at right angles, as at 53, and which permits other light to pass directly therethrough as at 54. The light rays 54 are again intercepted by another transparent mirror 55 which reflects part of the rays at right angles as at 56, and permits others to pass through as at 57. Three photoelectric cells 58, 59 and 60 are utilized to be acted upon by the three channels of light rays 53, 56 and 57. In front of the photoelectric cell 58 an orange-red filter 61 is placed, permitting only orange-red light to act on the cell 58, and to cause a flow of current to actuate a solenoid 62 controlling a valve for a container 63 filled with blue pigment. In front of the cell 59 a green filter 64 is placed, permitting only green light to excite the cell 59 and actuate another solenoid 65 controlling the valve to a container 66 filled with red pigment. In front of the photoelectric cell 60, a violet-blue filter 67 is placed, permitting only violet-blue light to excite the cell 60 causing a flow of current to a solenoid 68 which controls the flow of yellow pigment from a container 69.

The apparatus shown in Fig. 8 will operate in exactly the same manner as described in connection with Fig. 1, except that only one scanning of the plate is necessary, all three colors being printed during said one scanning operation.

If it is desired to print from positive plates, that is, negative plates which have been put through a chemical reversal process before mentioned, the process is identical to that last described with three air brushes, except that the action of the light reaching the photosensitive cell causes the electromagnetic valve of the air brush to close instead of to open. The object of this process is that wherever an additive prime color complementary to one of the subtractive prime colors for printing appears on the color screen of the plate, the air brush containing the complementary color to such prime additive color must be closed. Thus, wherever a positive color plate shows white and therefore has all three colors of the color screen exposed, it will act upon all three of the light sensitive cells of the apparatus shown in Fig. 8, and will cause all three of the air brushes to close, leaving the surface of the paper uncoated or white. A similar procedure may be followed for printing from a colored picture not in the form of a transparency, and this may be accomplished by identical apparatus to that illustrated, except that the source of light 39 is placed in front of the original as shown in Fig. 10 to cause reflected rays of light therefrom to be directed toward the photoelectric cells. Thus, where the original appears white, all three of the photoelectric cells will be excited, causing all three of the color valves to close to leave the paper to be printed on uncoated or white, and when the positive shows black no light is reflected and therefore all three brushes remain open and deposit yellow, red and blue respectively which produce black on the print. Other colors will be reproduced accordingly. For example, if green appears on the positive, this will excite the photoelectrical cell controlling the flow of red pigment, red being the complementary color to green. This will then cause closing of the valve in connection with the red color container. The valves for yellow and blue will, however, be left open and the combination of these two colors printing at the same time will produce the desired green on the receiving surface.

The mechanical device and the method of scanning and printing can also be applied to make prints from three separate negatives or positives, that is, one for each prime additive color by providing three sets of brackets 33 in the apparatus of Fig. 8 to mount the three plates in proper relation on the device so that the separate plates for each prime color can be properly put into registration and scanned at one time, providing a separate shield 36 and source of light is used with each separate color plate. Plates of this type may also be scanned separately by using the apparatus and method of Fig. 1.

Separate filters between the plate and photocell would be unnecessary in this case as each separate photographic plate would contain the record of only one color, the plate itself serving as the filter.

The system may also be employed effectively for printing pictures from a negative color plate, positive color plate, or original picture at a point removed from the original plate or picture. This may be accomplished by lengthening the conductors 41 and by using suitable amplifiers to keep the electrical current stepped up to a proper degree, and by using modulated oscillators and filters to properly keep the impulses generated by each photocell as separate electrical transmissions over a common electrical carrier system, and by also using at the receiving end necessary electrical tuning devices and demodulators to produce the electrical counterpart of the electrical energy originating in the photocells at the transmission end. It is also necessary when so using the apparatus to provide any suitable electrical means for synchronizing the scanning movement of the color plate with the movement of the surface on which the printing is to be done.

In the claims, the expression "color original" is to be interpreted as any one of the following: a negative color plate, a positive color plate, a non-transparent colored picture, or a colored object.

From the above, it may be seen that a very effective method and apparatus has been devised for accurately producing prints in colors from a color plate or the like.

What I claim is:

1. In an apparatus for producing color prints from a color plate negative, a light sensitive electric cell, a source of light positioned to direct a beam through said negative toward the light sensitive electric cell, a picture receiving surface, means for moving said negative relative to said source of light to cause scanning of successive elements of the negative and for moving the picture receiving surface synchronously with the negative, means between the beam of light and the cell to provide for passage of rays of only one additive prime color to said cell to transmit to the latter a beam controlled by the occurrence of said additive prime color in the negative, and color applying means electrically controlled by said cell for depositing on the receiving surface pigment of a subtractive prime color which is complementary to the additive prime color of the rays acting on the light sensitive cell.

2. In an apparatus for producing color prints from a color plate negative, a light sensitive electric cell, a source of light positioned to direct a beam through said negative toward the light sensitive electric cell, a picture receiving surface, means for moving said negative relative to said source of light to cause scanning of successive elements of the negative and for moving the picture receiving surface synchronously with the negative, a light filter between the beam of light and the cell to provide for passage of rays of only one additive prime color to said cell to transmit to the latter a beam controlled by the occurrence of said additive prime color in the negative, and color applying means electrically controlled by said cell for depositing on the receiving surface pigment of a subtractive prime color which is complementary to the additive prime color of the rays acting on the light sensitive cell.

3. Apparatus for producing color prints from a color positive comprising a plurality of light sensitive electric cells, a source of light, means for directing a beam of light from said source to said color positive and from said positive to said light sensitive cell, a picture receiving surface, means for moving said positive relative to said source of light to cause scanning of successive elements of the positive and for moving the picture receiving surface synchronously with the positive, means between the beam of light and the cell for separating the beam into a plurality of rays, each ray being directed toward one cell, means providing for passage of light of only one additive prime color to each cell to transmit to the latter a beam controlled by the occurrence of said additive prime color on the positive, color applying means normally open to apply pigment of all three subtractive prime colors on the receiving surface and electrically controlled by the light sensitive cells to shut off the flow of pigment of a color complementary to that appearing on the particular part of the positive being scanned.

4. Apparatus for producing color prints from a color positive comprising a plurality of light sensitive electric cells, a source of light, means for directing a beam of light from said source to said color positive for reflection from said positive to said light sensitive cell, a picture receiving surface, means for moving said positive relative to said source of light to cause scanning of successive elements of the positive and for moving the picture receiving surface synchronously with the positive, means between the beam of light and the cell for separating the beam into a plurality of rays, each ray being directed toward one cell, means providing for passage of light of only one additive prime color to each cell to transmit to the latter a beam controlled by the occurrence of said additive prime color on the positive, color applying means normally open to apply pigment of all three subtractive prime colors on the receiving surface and electrically controlled by the light sensitive cells to shut off the flow of pigment of a color complementary to that appearing on the particular part of the positive being scanned.

5. Apparatus for producing color prints from a color positive comprising a plurality of light sensitive electric cells, a source of light, means for directing a beam of light from said source through said color positive and from said positive to said light sensitive cell, a picture receiving surface, means for moving said positive relative to said source of light to cause scanning of successive elements of the positive and for moving the picture receiving surface synchronously with the positive, means between the beam of light and the cell for separating the beam into a plurality of rays, each ray being directed toward one cell, means providing for passage of light of only one additive prime color to each cell to transmit to the latter a beam controlled by the occurrence of said additive prime color on the positive, color applying means normally open to apply pigment of all three subtractive prime colors on the receiving surface and electrically controlled by the light sensitive cells to shut off the flow of pigment of a color complementary to that appearing on the particular part of the positive being scanned.

FRANCIS J. HINTON.